US012518445B2

(12) United States Patent
Qi et al.

(10) Patent No.: US 12,518,445 B2
(45) Date of Patent: Jan. 6, 2026

(54) METHOD AND APPARATUS FOR CARDIAC SIGNAL REMOVAL IN DATA-DRIVEN RESPIRATORY GATING IN POSITRON EMISSION TOMOGRAPHY SYSTEMS

(71) Applicants: THE REGENTS OF THE UNIVERSITY OF CALIFORNIA, Oakland, CA (US); CANON MEDICAL SYSTEMS CORPORATION, Tochigi (JP)

(72) Inventors: Wenyuan Qi, Vernon Hills, IL (US); Li Yang, Vernon Hills, IL (US); Jeffrey Kolthammer, Vernon Hills, IL (US); Evren Asma, Vernon Hills, IL (US); Jinyi Qi, Oakland, CA (US); Tiantian Li, Oakland, CA (US)

(73) Assignees: THE REGENTS OF THE UNIVERSITY OF CALIFORNIA, Oakland, CA (US); CANON MEDICAL SYSTEMS CORPORATION, Tochigi (JP)

(*) Notice: Subject to any disclaimer, the term of this patent is extended or adjusted under 35 U.S.C. 154(b) by 389 days.

(21) Appl. No.: 18/336,741

(22) Filed: Jun. 16, 2023

(65) Prior Publication Data
US 2024/0233211 A1 Jul. 11, 2024

Related U.S. Application Data

(60) Provisional application No. 63/479,052, filed on Jan. 9, 2023.

(51) Int. Cl.
A61B 6/03 (2006.01)
A61B 6/00 (2024.01)
G06T 7/20 (2017.01)
G06T 11/00 (2006.01)

(52) U.S. Cl.
CPC ............ *G06T 11/005* (2013.01); *A61B 6/037* (2013.01); *A61B 6/5288* (2013.01); *G06T 7/20* (2013.01); *G06T 2207/10104* (2013.01)

(58) Field of Classification Search
CPC ..... A61B 6/037; A61B 6/5288; G06T 11/005; G06T 2207/10104
See application file for complete search history.

(56) References Cited

U.S. PATENT DOCUMENTS

2005/0113674 A1\* 5/2005 Salla .................... A61B 6/5288
600/509
2006/0178575 A1\* 8/2006 Piacsek .................. A61B 6/037
600/413

(Continued)

FOREIGN PATENT DOCUMENTS

JP 2012-187350 A 10/2012

OTHER PUBLICATIONS

Extended European Search Report issued Jul. 8, 2024 in European Patent Application No. 24150798.7, 7 pages.
(Continued)

*Primary Examiner* — Colin T. Sakamoto
(74) *Attorney, Agent, or Firm* — Oblon, McClelland, Maier & Neustadt, L.L.P.

(57) ABSTRACT

A method for signal separation includes obtaining list mode data representing radiation detected during an imaging scan, the list mode data being affected by quasi-periodic motion of an imaging object; dividing the list mode data into first non-overlapping frames of a first frame length, and process the first frames to determine a cardiac cycle length; determining a second frame length, longer than the first frame length, based on the determined cardiac cycle length; re-binning the list mode data into overlapping frames having the second frame length, based on the non-overlapping frames having the first frame length; applying a principal (Continued)

component analysis (PCA) process on the re-binned list mode data having the second frame length to determine a respiratory waveform; determining a cardiac waveform using the determined respiratory waveform; and reconstructing an image based on the list mode data using the determined respiratory waveform and the determined cardiac waveform.

20 Claims, 11 Drawing Sheets

(56) References Cited

U.S. PATENT DOCUMENTS

| | | | |
|---|---|---|---|
| 2012/0237099 | A1 | 9/2012 | Hara et al. |
| 2013/0320973 | A1* | 12/2013 | Fenchel ............... A61B 6/5288 324/309 |
| 2016/0104279 | A1* | 4/2016 | Li .................... A61B 5/0044 382/131 |
| 2018/0014807 | A1* | 1/2018 | Hofmann ............... G06T 11/00 |
| 2020/0000424 | A1* | 1/2020 | Spottiswoode ...... A61B 6/5264 |
| 2022/0349976 | A1* | 11/2022 | Kunze .............. G01R 33/56509 |

OTHER PUBLICATIONS

Bertolli, "Data-Driven methods for respiratory signal detection in positron emission tomography", Institute of Nuclear Medicine, retrieved from the Internet: https://discovery.uci.ac.uk/id/eprint/10046541, Mar. 14, 2018, 149 pages, XP 093169881.

Thielemans et al., "Data-driven Dual-gating for Cardiac PET", 2014 IEEE Nuclear Science Symposium and Medical Imaging Conference (MSS/MIC), Nov. 8, 2014, 4 pages, XP 032879926.

* cited by examiner

METHOD AND APPARATUS FOR CARDIAC SIGNAL REMOVAL IN DATA-DRIVEN RESPIRATORY GATING IN POSITRON EMISSION TOMOGRAPHY SYSTEMS

CROSS REFERENCE TO RELATED APPLICATIONS

The present application claims priority to U.S. Provisional Application No. 63/479,052, entitled "Cardiac Signal Removal in Data-driven Respiratory Gating," filed on Jan. 9, 2023. The U.S. Provisional Application is incorporated herein by reference in its entirety.

FIELD

This disclosure relates to list-mode data gating in positron emission tomography (PET) systems as a means to eliminate motion-related inaccuracies and improve image quality in PET imaging.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Patient motion is a main source of blurring and artifacts in positron emission tomography (PET) imaging. Respiratory motion and cardiac motion during PET data acquisition can degrade quantitation performance by blurring images, leading to over-estimation of lesion volumes and under-estimation of lesion activity. Gating methods have been used to improve the quality of PET images. Typically, these methods need to use an external device to detect a biosignal, for example, a respiration waveform, electrocardiography (ECG), etc.

In some contexts, motion correction can be addressed by gating acquired data in which motion may have occurred. Gating involves dividing data into separates chunks (gates) within which motion is negligible. This may occur during voluntary or involuntary movement of the patient, and may include, for example, movement due to respiration or heartbeat.

In some PET systems, gating is done by attaching motion sensors to a patient during a PET scan. Such external motion sensors make PET scans more cumbersome as their use requires motion information to be successfully recorded during the scan. If motion is not recorded correctly or properly synchronized with the scan, then motion correction often is hampered.

Recently, data-driven approaches have been developed for extracting the biosignal from raw PET data, or from reconstructed images. For example, a data-driven algorithm can first divide the PET acquisitions into small temporal frames, and then principal component analysis (PCA) or independent component analysis (ICA) can be applied on the frames. The biosignal can be extracted based on the data variation across all the frames.

For instance, where there is respiratory motion, normally the principal variation can be caused by the respiratory motion. Thus, a respiratory signal can be modeled by the first component of the PCA. Once the respiratory motion is estimated, the PET data can be binned and reconstructed into multiple gates (for visualizing the motion) or a single gate (for generation of a single, motion-reduced image). However, when there is a heart beating in the acquisitions, the signal from the PCA can also include a cardiac signal.

Therefore, a method to separate the two signals so as to have better gating, either cardiac or respiratory gating, is desired.

SUMMARY

The present disclosure relates to a positron emission tomography (PET) imaging apparatus, including processing circuitry configured to obtain list mode data representing radiation detected during an imaging scan, the list mode data being affected by quasi-periodic motion of an imaging object, divide the list mode data into first non-overlapping frames of a first frame length, and process the first frames to determine a cardiac cycle length, determine a second frame length, longer than the first frame length, based on the determined cardiac cycle length, re-bin the list mode data into overlapping frames having the second frame length, based on the non-overlapping frames having the first frame length, apply a principal component analysis (PCA) process on the re-binned list mode data having the second frame length to determine a respiratory waveform, determine a cardiac waveform using the determined respiratory waveform, and reconstruct an image based on the list mode data using the determined respiratory waveform and the determined cardiac waveform.

The disclosure additionally relates to a method for signal separation, including obtaining list mode data representing radiation detected during an imaging scan, the list mode data being affected by quasi-periodic motion of an imaging object; dividing the list mode data into first non-overlapping frames of a first frame length, and process the first frames to determine a cardiac cycle length; determining a second frame length, longer than the first frame length, based on the determined cardiac cycle length; re-binning the list mode data into overlapping frames having the second frame length, based on the non-overlapping frames having the first frame length; applying a principal component analysis (PCA) process on the re-binned list mode data having the second frame length to determine a respiratory waveform; determining a cardiac waveform using the determined respiratory waveform; and reconstructing an image based on the list mode data using the determined respiratory waveform and the determined cardiac waveform.

The disclosure additionally relates to a non-transitory computer-readable storage medium including executable instructions, which when executed by circuitry, cause the circuitry to perform a method of signal separation, comprising obtaining list mode data representing radiation detected during an imaging scan, the list mode data being affected by quasi-periodic motion of an imaging object; dividing the list mode data into first non-overlapping frames of a first frame length, and process the first frames to determine a cardiac cycle length; determining a second frame length, longer than the first frame length, based on the determined cardiac cycle length; re-binning the list mode data into overlapping frames having the second frame length, based on the non-overlapping frames having the first frame length; applying a principal component analysis (PCA) process on the re-binned list mode data having the second frame length to determine a respiratory waveform; determining a cardiac waveform using the determined respiratory waveform; and reconstructing an image based on the list mode data using the determined respiratory waveform and the determined cardiac waveform.

Note that this summary section does not specify every embodiment and/or incrementally novel aspect of the present disclosure or claimed invention. Instead, the summary only provides a preliminary discussion of different embodiments and corresponding points of novelty. For additional details and/or possible perspectives of the disclosure and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting.

For example, the order of discussion of the different steps as described herein has been presented for the sake of clarity. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present disclosure can be embodied and viewed in many different ways.

Furthermore, as used herein, the words "a," "an," and the like generally carry a meaning of "one or more," unless stated otherwise.

Numerous modifications and variations are possible in light of the above teachings. It is therefore to be understood that within the scope of the appended claims, the disclosure can be practiced otherwise than as specifically described herein.

Note that while the following embodiments are described in the context of respiratory gating, it is not meant to be restrictive. One skilled in the art will recognize that the concepts and principles discussed can be extended to other gating applications, such as cardiac gating, for example.

Figure 1:
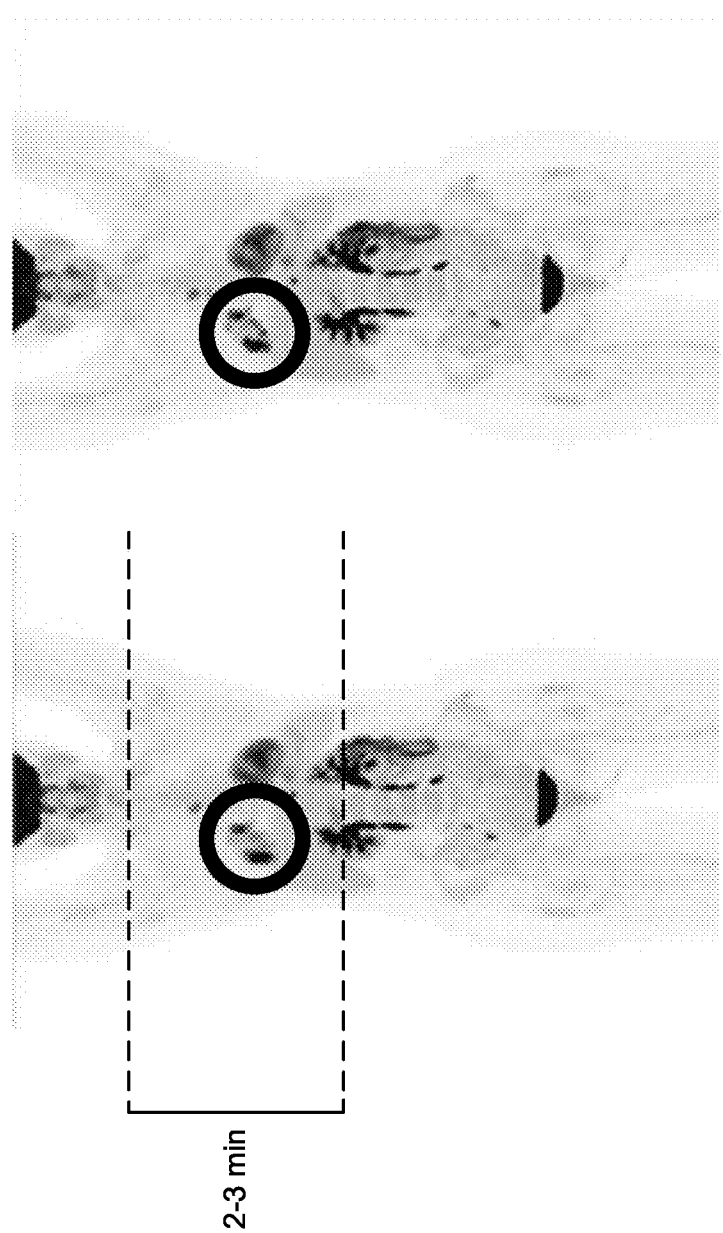
FIG. 1 shows a schematic of a whole body PET scan with and without respiratory gating, according to an embodiment of the present disclosure.

FIG. 1 shows a schematic of a whole-body PET scan with and without respiratory gating, according to an embodiment of the present disclosure. In an embodiment, on the left (in the circle) of FIG. 1, a lung mass can be detected based on a scan duration of approximately 2 to 3 minutes for the highlighted portion in which the lung mass is disposed. On the right (in the circle) of FIG. 1, retrospective respiratory gating can be applied. While there can be fewer counts, a sharper image can be produced using the respiratory gating. This can lead to a change or improvement in a staging diagnosis for a patient. The gating can be performed by synchronizing data acquisition with the gate and then retrospectively sorting the data for eventual image reconstruction.

Figure 2A:
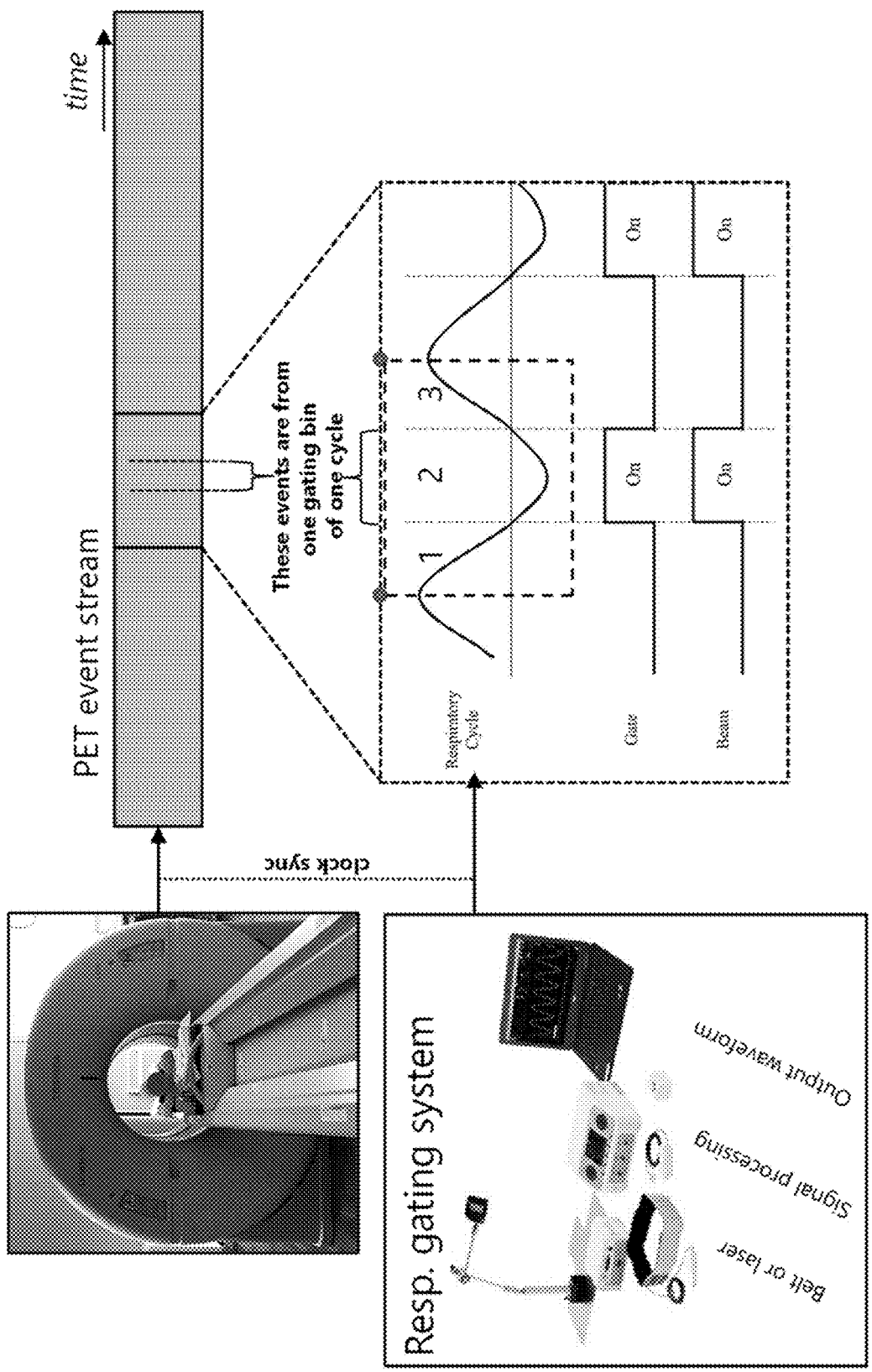
FIG. 2A shows a schematic of an overview of a PET system for gating in list-mode acquisition, according to an embodiment of the present disclosure.

FIG. 2A shows a schematic of an overview of a PET system for gating in list-mode acquisition, according to an embodiment of the present disclosure. In an embodiment, a respiratory gating system can be synchronized to the imaging apparatus, which can include a timing or clock sync. During the synchronized data acquisition, the PET event stream can be generated with the respiratory gating or cycle data. As shown, a beam of the imaging apparatus can be active when a predetermined portion of the respiratory cycle occurs, which can be the target gate. Thus, a portion of the entire PET event stream can be filtered for event occurring during the predetermined portion of the respiratory cycle (e.g., with the beam active, with the gate on/active, etc.).

Figure 2B:
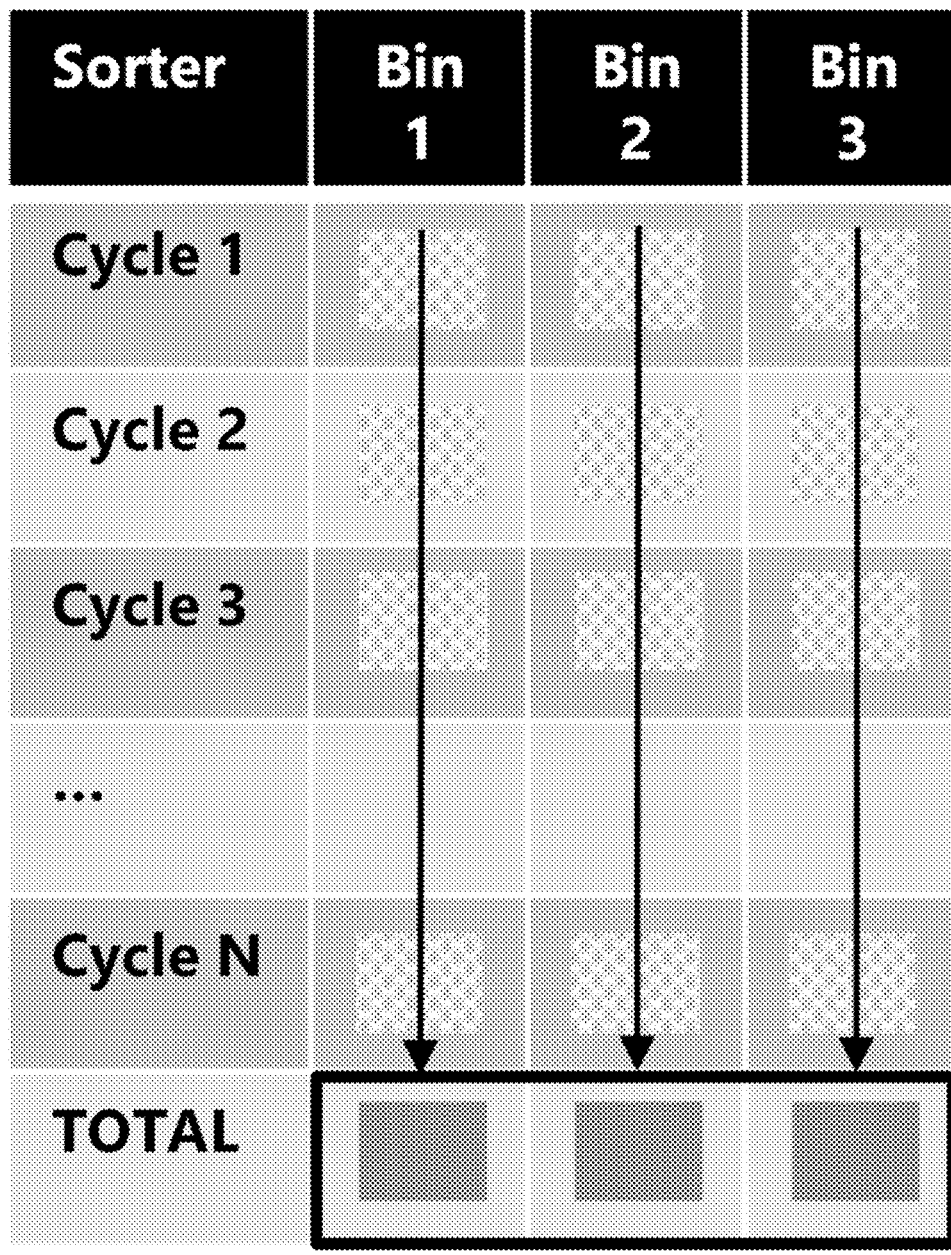
FIG. 2B shows a schematic of sorting the PET event stream into bins, according to an embodiment of the present disclosure.

FIG. 2B shows a schematic of sorting the PET event stream into bins, according to an embodiment of the present disclosure. In an embodiment, a complete respiratory cycle can be divided into multiple bins. For example, as shown, one complete respiratory cycle can be divided into three bins, and the three bins can correspond to the divided portions shown in FIG. 2A based on the output from the respiratory gating system. The events from each cycle can be divided into one of the three corresponding bins and aggregated over all cycles used for data processing. Thus, the three "total" bins together can represent the average data over all cycles. The divided bin data can individually be used to generate image reconstructions. For example, a reconstruction can be generated for the data in the first bin, a separate reconstruction can be generated for the data in the second bin, and another separate reconstruction can be generated for the data in the third bin. A cine image with three volumes can be generated, or, if desired, only the data for "bin 2" can be used since the "bin 2" data can correspond to the target gate event.

Figure 3:
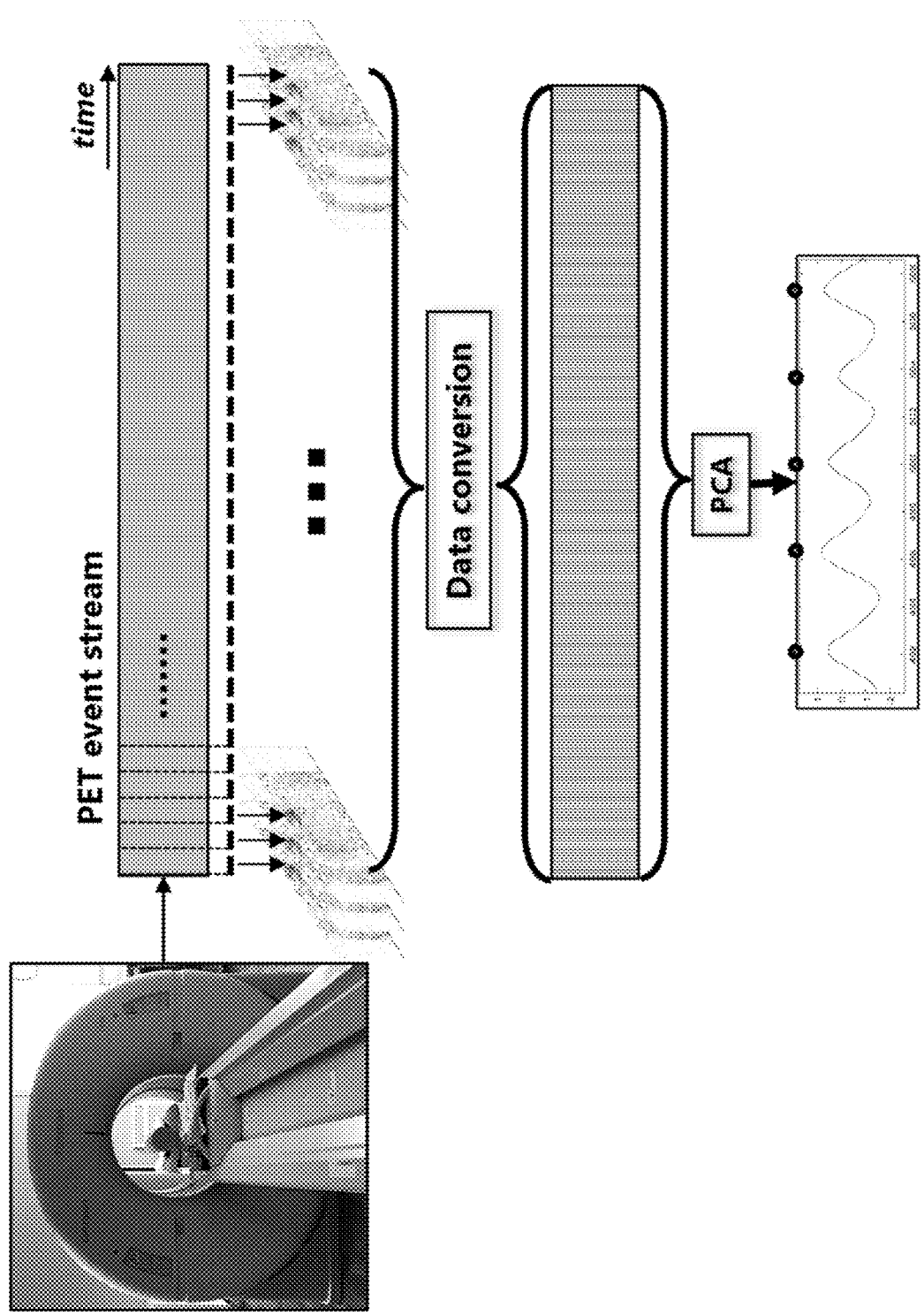
FIG. 3 shows a schematic for data-driven gating for respiratory motion, according to an embodiment of the present disclosure.

FIG. 3 shows a schematic for data-driven gating for respiratory motion, according to an embodiment of the present disclosure. In an embodiment, in data-driven respiratory gating, acquired PET data can be divided into small frames so that by measuring the variances between frames using PCA, a respiratory signal can be detected. For example, the respiratory waveform cycle can be between 3 sec to 5 sec. Therefore, the sampling rate can be at least 5 Hz or higher to capture respiratory motion. Notably, an external device need not be included with the imaging apparatus for the respiratory gating measurement. In brief, the list mode data can be regrouped or reorganized into short frames. The short frames can be formed into sinograms or images. The sinograms or images can then be reformed into feature vectors. PCA can be performed on the vectors to capture a motion signal among the short frames. Subsequently, respiratory triggers can be determined by analyzing the local maxima.

However, when cardiac beating occurs in the same image, PCA can potentially not recognize the difference between the cardiac beating and the respiratory cycle; hence, both cardiac and respiratory motion appear in the waveform. The cardiac beating signal can disturb the desired respiratory waveform, and both phase gating and amplitude gating can be confounded by the cardiac beating signal. One method of distinguishing the two motions can include frequency selection of the waveform in a frequency domain since cardiac beating is faster or more frequent than respiratory motion. However, method can require extra frequency domain processing.

Thus, the method described herein can increase a frame length for each small frame such that each frame can include a whole cardiac beating cycle, and therefore there can be no difference between frames cased by the cardiac beating signal. Notably, the steps between frames can remain short, such that the frames can capture the respiratory waveform.

Figure 4:
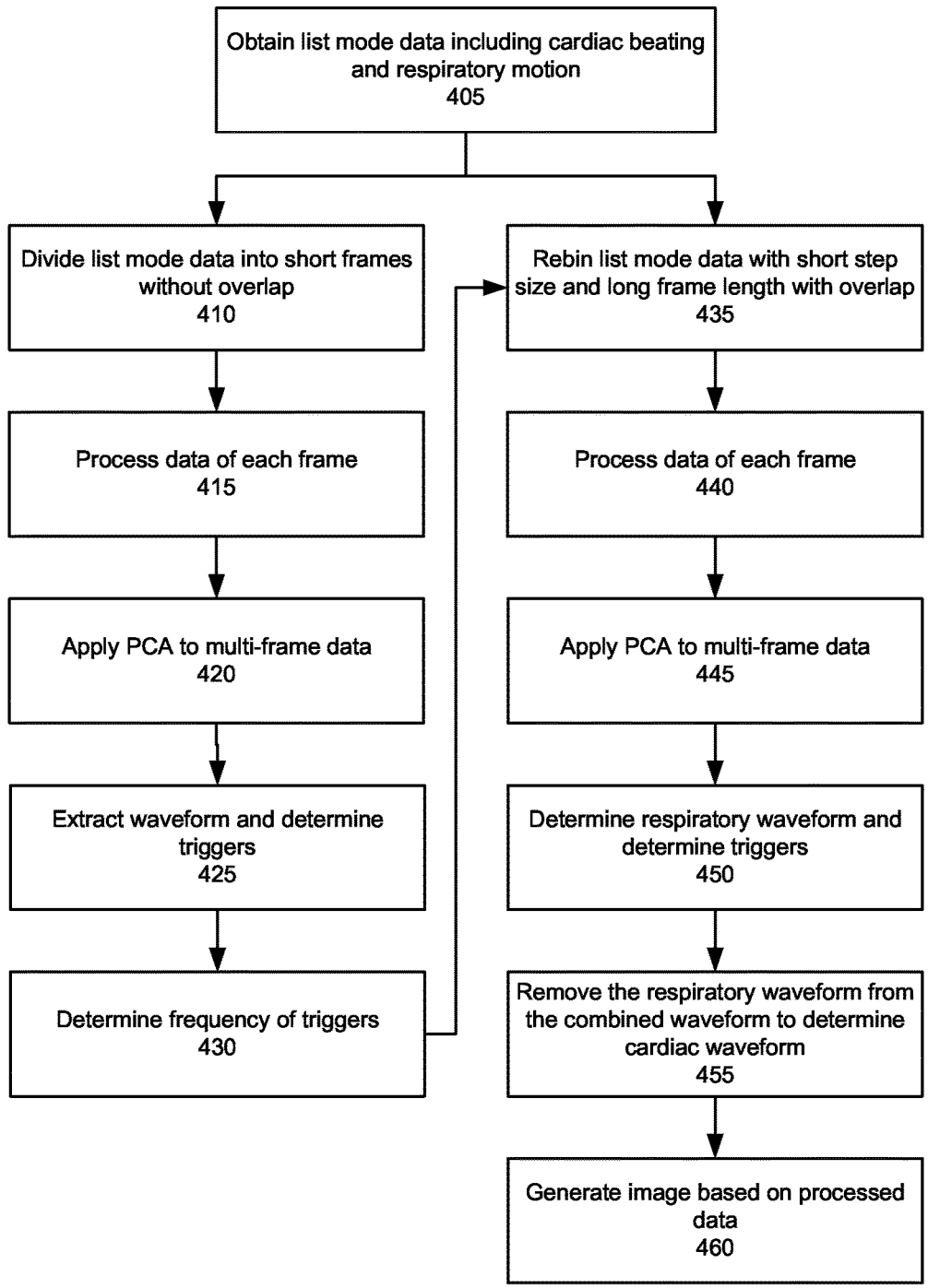
FIG. 4 shows a non-limiting example of a flow chart for a method of identifying and removing a cardiac beating signal, according to an embodiment of the present disclosure.

To this end, FIG. 4 shows a non-limiting example of a flow chart for a method 400 of identifying and removing a cardiac beating signal, according to an embodiment of the present disclosure.

In an embodiment, at step 405, list mode data for a gated bed including both cardiac beating and respiratory motion can be obtained via scanning a patient or object with the PET imaging apparatus.

In an embodiment, at step 410, the obtained list mode data can be split into short frames without overlap. For example, the short frames can be 0.1 seconds. For instance, consider a scenario where a patient's regular breathing cycle lasts 3 seconds. A data acquisition session can capture approximately 30 breathing cycles. Consequently, the resulting list-mode data spanning a duration of 90 seconds can be divided into 900 short frames, each with a duration of 0.1 seconds.

In an embodiment, at step 415, the data of each short frame can be processed. For example, the data can be re-binned into a sinogram, or a time of flight (TOF) plotting, or a reconstruction, among others. It may be appreciated that other methods can be used to extract the motion from the portions or chunks of data.

In an embodiment, at step 420, PCA can be applied to the multi-frame data.

In an embodiment, at step 425, a waveform can be extracted, and triggers can be determined or identified by analyzing local maxima. The triggers can refer to a point of interest of the respiratory or the cardiac motion cycle. For example, the peak of each cycle can be the determined trigger(s). Thus, one cycle of respiratory motion or one cycle of cardiac beating can occur between two triggers.

In an embodiment, at step 430, a frequency of the identified triggers can be determined.

In an embodiment, at step 435, the list mode data can be re-binned with a short step size and a long frame length with a predetermined overlap. The frame length can be based on, for example, the frequency of the triggers such that each frame includes a whole cycle of the cardiac beating. The frame length can be a set value, such as 1 second, or 0.8 seconds, or 0.6 seconds, or 0.4 seconds, or any value less than a duration of the respiratory cycle.

In an embodiment, at step 440, the data of each long frame can be processed. For example, the data can be re-binned to a sinogram, or a time of flight (TOF) plotting, or a reconstruction as previously described.

In an embodiment, at step 445, PCA can be applied again after re-binning the list mode data to generate the multi-frame data.

In an embodiment, at step 450, a new waveform, such as the respiratory waveform, can be determined, and triggers can be determined or identified by analyzing local maxima. Notably, the new waveform can be without the cardiac beating.

In an embodiment, at step 455, the respiratory waveform can be removed from the combined waveform to determine the cardiac waveform. The combined waveform can be the waveform generated in step 425.

In an embodiment, at step 460, an image can be generated or reconstructed based on the data having the cardiac waveform and the respiratory waveform identified and accounted for. For example, once the respiratory waveform is obtained and the corresponding triggers determined, respiratory gating can be performed. It may be appreciated that other methods can be used, such as phase gating, amplitude gating, etc.

In an embodiment, the method 400 can proceed from step 405 to step 435 without determining the frequency of the triggers, such as the cardiac cycle length. Instead, the set value for the frame length can be used, such as 1 second.

Figure 5:
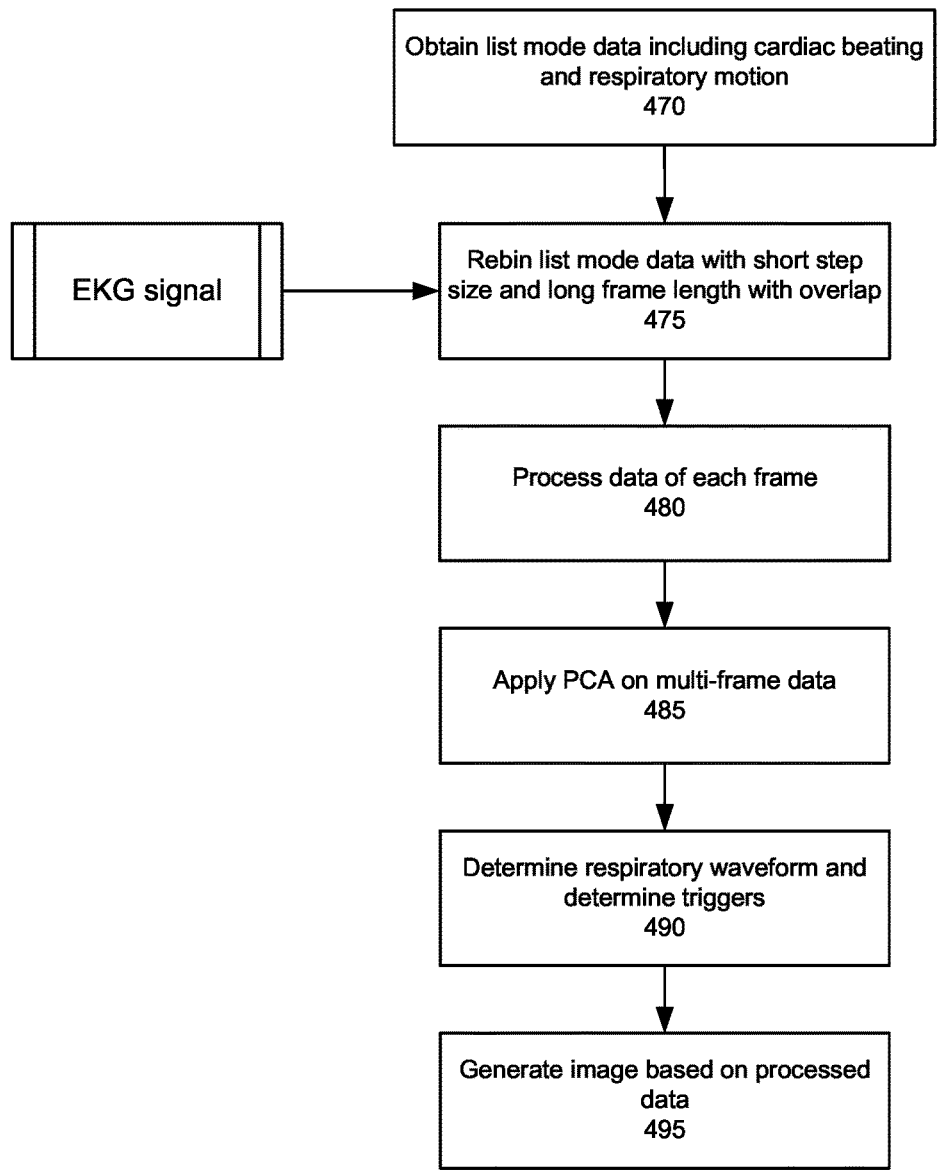
FIG. 5 shows a non-limiting example of a flow chart for a method of identifying and removing a cardiac beating signal with an auxiliary device, according to an embodiment of the present disclosure.

Additionally or alternatively, FIG. 5 shows a non-limiting example of a flow chart for a method 401 of identifying and removing a cardiac beating signal with an auxiliary device, according to an embodiment of the present disclosure.

In an embodiment, at step 470, list mode data for a gated bed including both cardiac beating and respiratory motion can be obtained via scanning a patient or object with the PET imaging apparatus.

In an embodiment, at step 475, similar to the previous description, the list mode data can be re-binned with a short step size and a long frame length with a predetermined overlap. The frame length can be based on the frequency of the triggers such that each frame includes a whole cycle of the cardiac beating. The cardiac beating rate or cycle can be provided by an EKG signal, for example, or any other input from a cardiac measuring device.

In an embodiment, at step 480, similar to the previous description, the data of each long frame can be processed. For example, the data can be re-binned to a sinogram, or a time of flight (TOF) plotting, or a reconstruction.

In an embodiment, at step 485, similar to the previous description, PCA can be applied to the multi-frame data.

In an embodiment, at step 490, similar to the previous description, the respiratory waveform can be removed from the combined waveform to determine the cardiac waveform.

In an embodiment, at step 495, similar to the previous description, an image can be generated or reconstructed based on the data having the cardiac waveform and the respiratory waveform identified and accounted for.

Figure 6A:
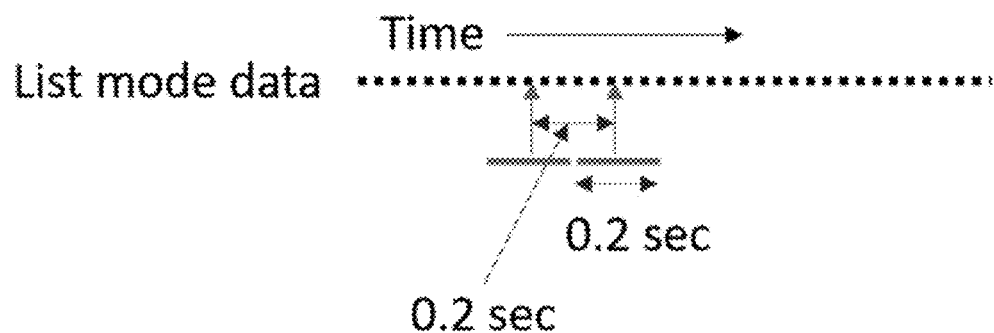
FIG. 6A shows a schematic for data splitting of data-driven gating, according to an embodiment of the present disclosure.
Figure 6B:
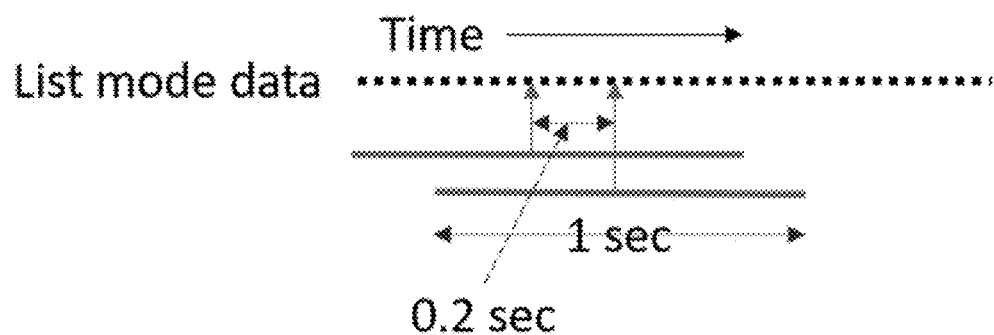
FIG. 6B shows a schematic for data splitting of data-driven gating, according to an embodiment of the present disclosure.

FIG. 6A shows a schematic for data splitting of data-driven gating, according to an embodiment of the present disclosure. FIG. 6B shows a schematic for data splitting of data-driven gating, according to an embodiment of the present disclosure. In an embodiment, the data splitting method of FIG. 6A can have a 0.2 second step size with no overlap, and can represent a common data splitting method. However, for the data splitting method described herein and with reference to FIG. 6B, the length of the frame can be longer, such as 1 second, and there can be overlap between frames, while the step size can still be 0.2 seconds. The overlap can help to identify and remove the cardiac signal.

Figure 7:
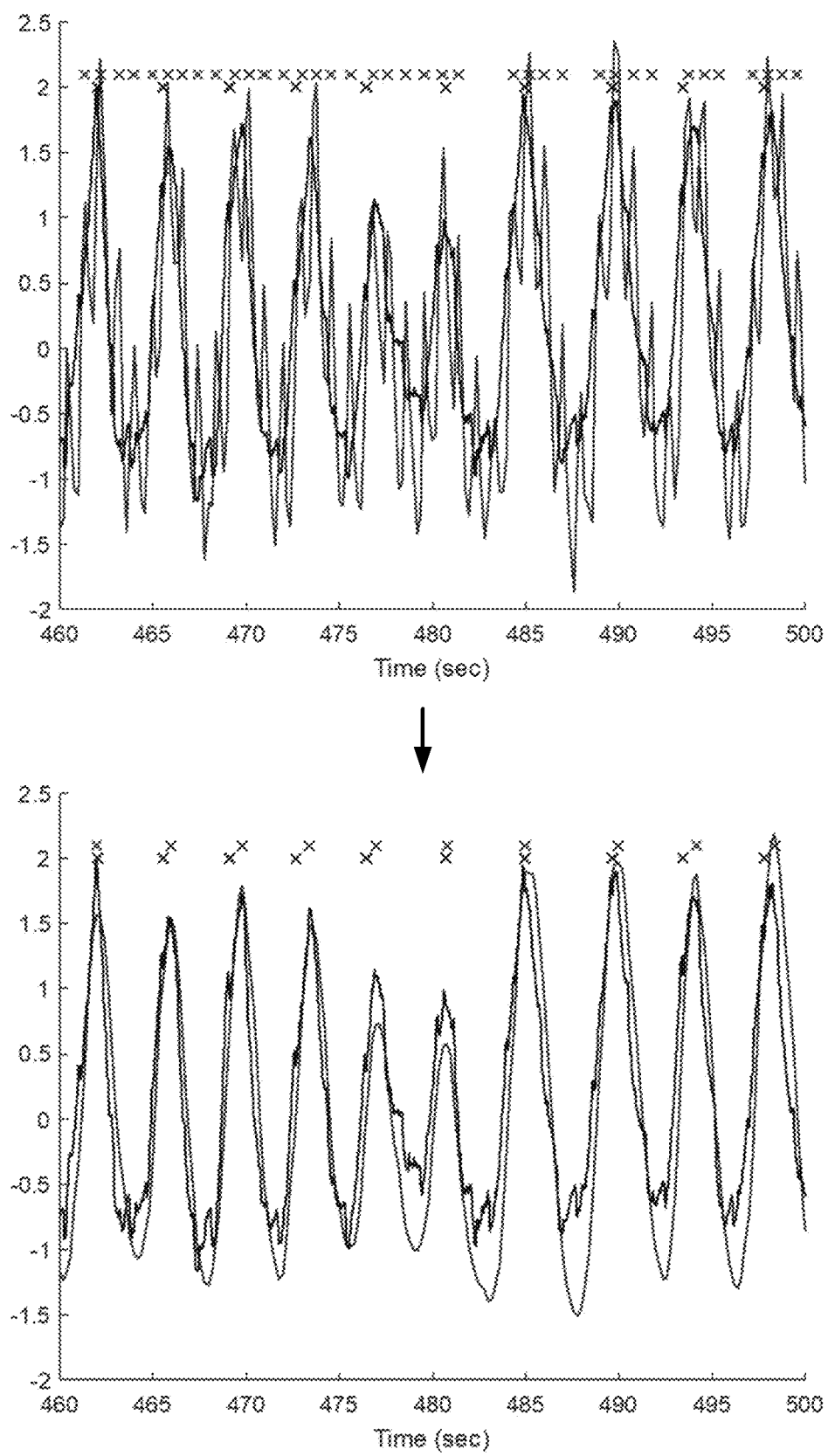
FIG. 7 shows another example of removing the cardiac signal, according to an embodiment of the present disclosure.

To this end, FIG. 7 shows a data driven signal and removal of the cardiac signal, according to an embodiment of the present disclosure. The less smooth trace is the trace with the data driven gating frame length of, for example, 0.2 seconds, and a step size of, for example, 0.2 seconds, and no overlap between frames, thus yielding many peaks and eventually many triggers. The smoother trace is the trace with the data driven gating frame length of, for example, 1 second, a step size of, for example, 0.2 seconds again, and an introduced overlap between frames, thus yielding fewer peaks and eventually fewer triggers.

In an embodiment, the frame length can be increased so that each frame covers an entire cardiac beating cycle. The bottom graph shows the data from the top graph with the longer frame length and overlapping frames applied to yield smoother traces with fewer peaks, thus capturing the respiratory cycle.

Figure 8:
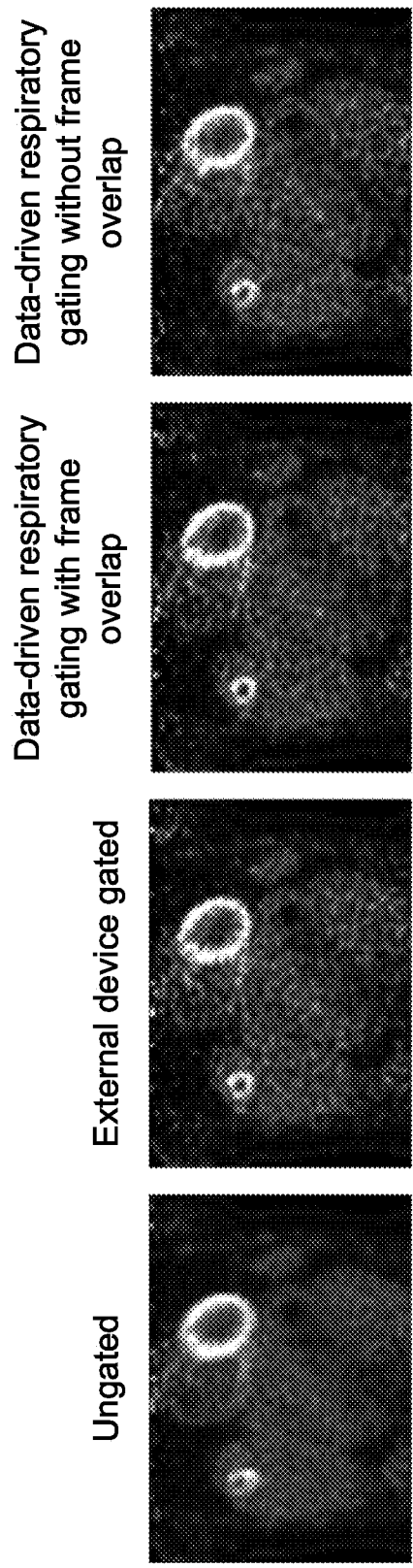
FIG. 8 shows a series of reconstructed images describing the effect of gating with and without frame overlap, according to an embodiment of the present disclosure.

FIG. 8 shows a series of reconstructed images describing the effect of gating with and without frame overlap, according to an embodiment of the present disclosure. In an embodiment, FIG. 8 shows a reconstructed image from ungated, Anzai-gated, 1 second-gated, and 0.2 second-gated data. As shown, it is clear that the data driven gating frame length of 0.2 seconds still includes respiratory motion blur, indicated by the arrows. In contrast, the Anzai-gated and the data driven gating frame length of 1 second reconstructed images result in less motion blur. This is especially apparent when compared with the ungated reconstructed image. Notably, the data driven gating frame length of 1 second yields a reconstructed image that is very similar to the reconstructed image using a dedicated, auxiliary device to measure the respiratory cycle (Anzai-gated), thus demonstrating the effectiveness of the longer frame length with overlap.

Figure 9A:
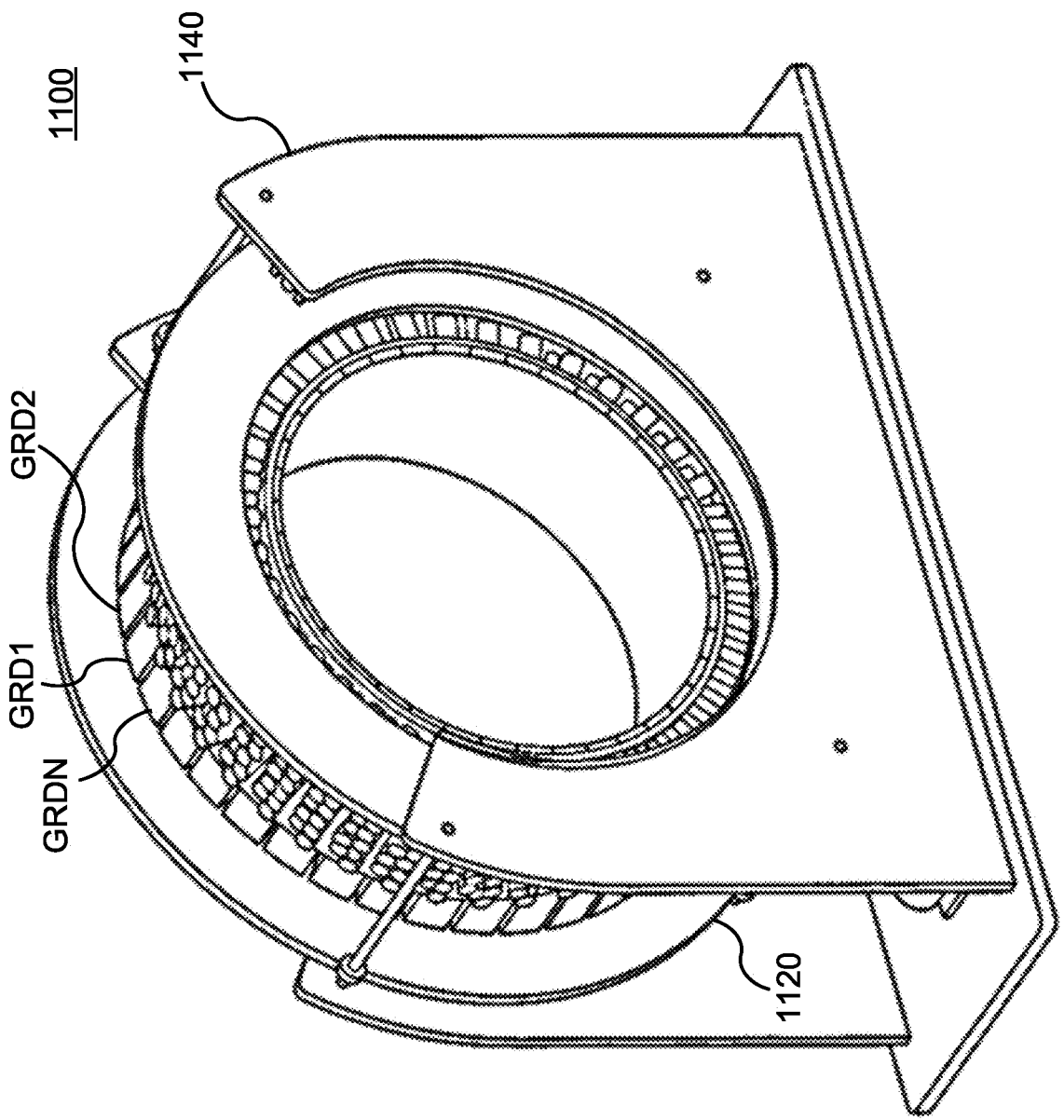
FIG. 9A is an illustration of a perspective view of a PET scanner apparatus, according to embodiments of the present disclosure.
Figure 9B:
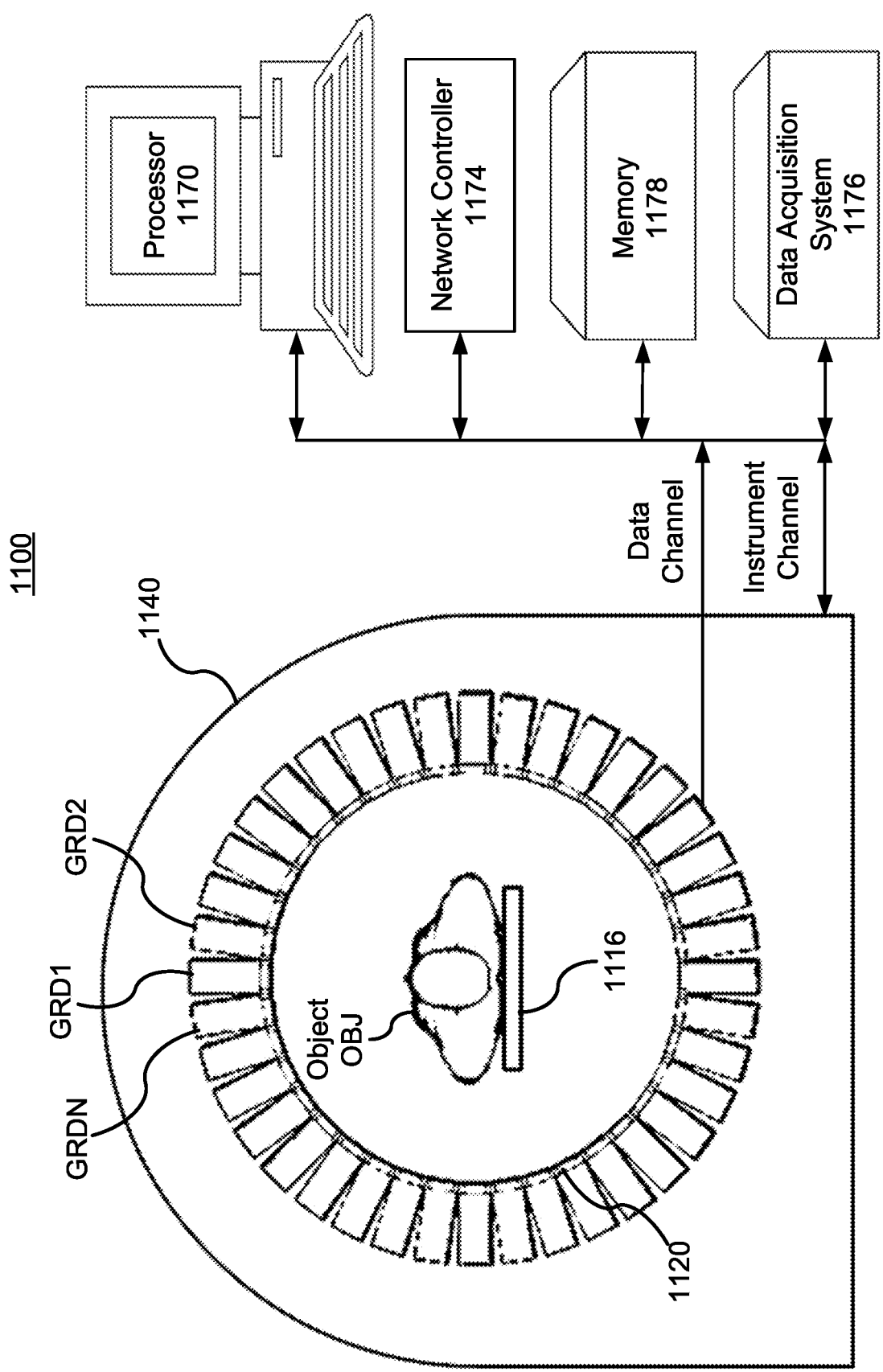
FIG. 9B is a schematic of a PET scanner apparatus and associated hardware, according to embodiments of the present disclosure.

FIGS. 9A and 9B show a non-limiting example of a PET scanner 1100 that can implement the methods 400 and 401. The PET scanner 1100 includes a number of gamma-ray detectors (GRDs) (e.g., GRD1, GRD2, through GRDN) that are each configured as rectangular detector modules. According to one implementation, the detector ring includes 40 GRDs. In another implementation, there are 48 GRDs, and the higher number of GRDs is used to create a larger bore size for the PET scanner 1100.

Each GRD can include a two-dimensional array of individual detector crystals, which absorb gamma radiation and emit scintillation photons. The scintillation photons can be detected by a two-dimensional array of photomultiplier tubes (PMTs) that are also arranged in the GRD. A light guide can be disposed between the array of detector crystals and the PMTs.

Alternatively, the scintillation photons can be detected by an array a silicon photomultipliers (SiPMs), and each individual detector crystals can have a respective SiPM.

Each photodetector (e.g., PMT or SiPM) can produce an analog signal that indicates when scintillation events occur, and an energy of the gamma ray producing the detection event. Moreover, the photons emitted from one detector crystal can be detected by more than one photodetector, and, based on the analog signal produced at each photodetector, the detector crystal corresponding to the detection event can be determined using Anger logic and crystal decoding, for example.

FIG. 9B shows a schematic view of a PET scanner system having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIGS. 9A and 9B. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 9B shows an example of the arrangement of the PET scanner 1100, in which the object OBJ to be imaged rests on a table 1116 and the GRD modules GRD1 through GRDN are arranged circumferentially around the object OBJ and the table 1116. The GRDs can be fixedly connected to a circular component 1120 that is fixedly connected to the gantry 1140. The gantry 1140 houses many parts of the PET imager. The gantry 1140 of the PET imager also includes an open aperture through which the object OBJ and the table 1116 can pass, and gamma-rays emitted in opposite directions from the object OBJ due to an annihilation event can be detected by the GRDs and timing and energy information can be used to determine coincidences for gamma-ray pairs.

In FIG. 9B, circuitry and hardware is also shown for acquiring, storing, processing, and distributing gamma-ray detection data. The circuitry and hardware include: a processor 1170, a network controller 1174, a memory 1178, and a data acquisition system (DAS) 1176. The PET imager also includes a data channel that routes detection measurement results from the GRDs to the DAS 1176, the processor 1170, the memory 1178, and the network controller 1174. The DAS 1176 can control the acquisition, digitization, and routing of the detection data from the detectors. In one implementation, the DAS 1176 controls the movement of the bed 1116. The processor 1170 performs functions including reconstructing images from the detection data, pre-reconstruction processing of the detection data, and post-reconstruction processing of the image data, as discussed herein.

The processor 1170 can be configured to perform various steps of methods 400 and/or 401 described herein and variations thereof. The processor 1170 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 1170 can execute a computer program including a set of computer-readable instructions that perform various steps of method 100 and/or method 200, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

The memory 1178 can be a hard disk drive, CD-ROM drive, DVD drive, FLASH drive, RAM, ROM or any other electronic storage known in the art.

The network controller 1174, such as an Intel Ethernet PRO network interface card from Intel Corporation of America, can interface between the various parts of the PET imager. Additionally, the network controller 1174 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 11G and 4G wireless cellular systems. The wireless network can also be WiFi, Bluetooth, or any other wireless form of communication that is known.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Embodiments of the present disclosure may also be as set forth in the following parentheticals.

(1) A positron emission tomography (PET) imaging apparatus, comprising: processing circuitry configured to obtain list mode data representing radiation detected during an imaging scan, the list mode data being affected by quasi-periodic motion of an imaging object, divide the list mode data into first non-overlapping frames of a first frame length, and process the first frames to determine a cardiac cycle length, determine a second frame length, longer than the first frame length, based on the determined cardiac cycle length, re-bin the list mode data into overlapping frames having the second frame length, based on the non-overlapping frames having the first frame length, apply a principal component analysis (PCA) process on the re-binned list mode data having the second frame length to determine a respiratory waveform, determine a cardiac waveform using the determined respiratory waveform, and reconstruct an image based on the list mode data using the determined respiratory waveform and the determined cardiac waveform.

(2) The apparatus of (1), wherein the processing circuitry is further configured to determine the second frame length by applying the PCA process to the first non-overlapping frames to determine a first waveform, and determine peaks of the determined first waveform, and determining the cardiac cycle length based on a frequency of the determined peaks of the first waveform.

(3) The apparatus of either (1) or (2), wherein the processing circuitry is configured to determine the frequency of the determined peaks of the first waveform, the determined frequency being a cardiac beating rate.

(4) The apparatus of any one of (1) to (3), wherein the second frame length determined by the processing circuitry is a value less than a frequency of peaks of the respiratory waveform.

(5) The apparatus of any one of (1) to (4), wherein the second frame length determined by the processing circuitry is 1 second.

(6) The apparatus of any one of (1) to (5), wherein the processing circuitry is configured to set the first frame length to a value less than 0.4 seconds.

(7) The apparatus of any one of (1) to (6), wherein the processing circuitry is further configured to reconstruct the image based on the list mode data processed using the determined respiratory waveform and the determined cardiac waveform by applying a respiratory gate based on the determined respiratory waveform and removing the cardiac waveform.

(8) The apparatus of any one of (1) to (7), wherein the imaging apparatus includes an electrocardiogram (ECG) device, and the processing circuitry is further configured to determine the second frame length by measuring the cardiac cycle length of the imaging object via the ECG device.

(9) The apparatus of any one of (1) to (8), wherein the overlapping frames having the second frame length overlap by the first frame length.

(10) The apparatus of any one of (1) to (9), wherein the processing circuitry is further configured to re-bin the list mode data by re-binning to a sinogram.

(11) A method of signal separation, comprising: obtaining list mode data representing radiation detected during an imaging scan, the list mode data being affected by quasi-periodic motion of an imaging object; dividing the list mode data into first non-overlapping frames of a first frame length, and process the first frames to determine a cardiac cycle length; determining a second frame length, longer than the first frame length, based on the determined cardiac cycle length; re-binning the list mode data into overlapping frames having the second frame length, based on the non-overlapping frames having the first frame length; applying a principal component analysis (PCA) process on the re-binned list mode data having the second frame length to determine a respiratory waveform; determining a cardiac waveform using the determined respiratory waveform; and reconstructing an image based on the list mode data using the determined respiratory waveform and the determined cardiac waveform.

(12) The method of (11), wherein the determining the second frame length further comprises applying the PCA process to the first non-overlapping frames to determine a first waveform, and determine peaks of the determined first waveform; and determining the cardiac cycle length based on a frequency of the determined peaks of the first waveform.

(13) The method of either (11) or (12), further comprising determining the frequency of the determined peaks of the first waveform, the determined frequency being a cardiac beating rate.

(14) The method of any one of (11) to (13), wherein the second frame length is a value less than a frequency of peaks of the respiratory waveform.

(15) The method of any one of (11) to (14), wherein the second frame length is 1 second.

(16) The method of any one of (11) to (15), wherein the first frame length is a value less than 0.4 seconds.

(17) The method of any one of (11) to (16), wherein the reconstructing the image based on the list mode data processed using the determined respiratory waveform and the determined cardiac waveform further comprises applying a respiratory gate based on the determined respiratory waveform and removing the cardiac waveform.

(18) The method of any one of (11) to (17), wherein the determining the second frame length further comprises measuring the cardiac cycle length of the imaging object via a connected ECG device.

(19) The method of any one of (11) to (18), wherein the overlapping frames having the second frame length overlap by the first frame length.

(20) A non-transitory computer-readable storage medium including executable instructions, which when executed by circuitry, cause the circuitry to perform a method of signal separation, comprising obtaining list mode data representing radiation detected during an imaging scan, the list mode data being affected by quasi-periodic motion of an imaging object; dividing the list mode data into first non-overlapping frames of a first frame length, and process the first frames to determine a cardiac cycle length; determining a second frame length, longer than the first frame length, based on the determined cardiac cycle length; re-binning the list mode data into overlapping frames having the second frame length, based on the non-overlapping frames having the first frame length; applying a principal component analysis (PCA) process on the re-binned list mode data having the second frame length to determine a respiratory waveform; determining a cardiac waveform using the determined respiratory waveform; and reconstructing an image based on the list mode data using the determined respiratory waveform and the determined cardiac waveform.

(21) A positron emission tomography (PET) scanner comprising processing circuitry configured to receive list-mode data; divide the list-mode data into a first and second data, wherein time windows of the first and second data are decided based on cardiac beating; and estimate a respiratory waveform based on the first and second data.

(22) The PET scanner of (21), wherein the time windows of the first and second data are decided based on one cycle of the cardiac beating.

(23) The PET scanner of (22), wherein the time windows of the first and second data includes the one cycle of the cardiac beating.

(24) The PET scanner of (21), wherein the time windows of the first and second data are about 1 second.

(25) The PET scanner of (21), wherein the time windows of the first and second data are overlapping at least part of one another.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. A positron emission tomography (PET) imaging apparatus, comprising:
processing circuitry configured to
obtain list mode data representing radiation detected during an imaging scan, the list mode data being affected by quasi-periodic motion of an imaging object,
divide the list mode data into first non-overlapping frames of a first frame length, and process the first frames to determine a cardiac cycle length,
determine a second frame length, longer than the first frame length, based on the determined cardiac cycle length,
re-bin the list mode data into overlapping frames having the second frame length, based on the non-overlapping frames having the first frame length,
apply a principal component analysis (PCA) process on the re-binned list mode data having the second frame length to determine a respiratory waveform,
determine a cardiac waveform using the determined respiratory waveform, and
reconstruct an image based on the list mode data using the determined respiratory waveform and the determined cardiac waveform.

2. The imaging apparatus of claim 1, wherein the processing circuitry is further configured to determine the second frame length by applying the PCA process to the first non-overlapping frames to determine a first waveform, and determine peaks of the determined first waveform, and determining the cardiac cycle length based on a frequency of the determined peaks of the first waveform.

3. The imaging apparatus of claim 2, wherein the processing circuitry is configured to determine the frequency of the determined peaks of the first waveform, the determined frequency being a cardiac beating rate.

4. The imaging apparatus of claim 1, wherein the second frame length determined by the processing circuitry is a value less than a frequency of peaks of the respiratory waveform.

5. The imaging apparatus of claim 4, wherein the second frame length determined by the processing circuitry is 1 second.

6. The imaging apparatus of claim 4, wherein the processing circuitry is configured to set the first frame length to a value less than 0.4 seconds.

7. The imaging apparatus of claim 1, wherein the processing circuitry is further configured to reconstruct the image based on the list mode data processed using the determined respiratory waveform and the determined cardiac waveform by applying a respiratory gate based on the determined respiratory waveform and removing the cardiac waveform.

8. The imaging apparatus of claim 1, wherein the imaging apparatus includes an electrocardiogram (ECG) device, and the processing circuitry is further configured to determine the second frame length by measuring the cardiac cycle length of the imaging object via the ECG device.

9. The imaging apparatus of claim 1, wherein the overlapping frames having the second frame length overlap by the first frame length.

10. The imaging apparatus of claim 1, wherein the processing circuitry is further configured to re-bin the list mode data by re-binning to a sinogram.

11. A method for signal separation, comprising:
obtaining list mode data representing radiation detected during an imaging scan, the list mode data being affected by quasi-periodic motion of an imaging object;
dividing the list mode data into first non-overlapping frames of a first frame length, and process the first frames to determine a cardiac cycle length;
determining a second frame length, longer than the first frame length, based on the determined cardiac cycle length;
re-binning the list mode data into overlapping frames having the second frame length, based on the non-overlapping frames having the first frame length;
applying a principal component analysis (PCA) process on the re-binned list mode data having the second frame length to determine a respiratory waveform;
determining a cardiac waveform using the determined respiratory waveform; and
reconstructing an image based on the list mode data using the determined respiratory waveform and the determined cardiac waveform.

12. The method of claim 11, wherein the determining the second frame length further comprises
applying the PCA process to the first non-overlapping frames to determine a first waveform, and determine peaks of the determined first waveform; and
determining the cardiac cycle length based on a frequency of the determined peaks of the first waveform.

13. The method of claim 12, further comprising determining the frequency of the determined peaks of the first waveform, the determined frequency being a cardiac beating rate.

14. The method of claim 11, wherein the second frame length is a value less than a frequency of peaks of the respiratory waveform.

15. The method of claim 14, wherein the second frame length is 1 second.

16. The method of claim 14, wherein the first frame length is a value less than 0.4 seconds.

17. The method of claim 11, wherein the reconstructing the image based on the list mode data processed using the determined respiratory waveform and the determined cardiac waveform further comprises applying a respiratory gate based on the determined respiratory waveform and removing the cardiac waveform.

18. The method of claim 11, wherein the determining the second frame length further comprises measuring the cardiac cycle length of the imaging object via a connected ECG device.

19. The method of claim 11, wherein the overlapping frames having the second frame length overlap by the first frame length.

20. A non-transitory computer-readable storage medium including executable instructions, which when executed by circuitry, cause the circuitry to perform a method of signal separation, comprising:
obtaining list mode data representing radiation detected during an imaging scan, the list mode data being affected by quasi-periodic motion of an imaging object;
dividing the list mode data into first non-overlapping frames of a first frame length, and process the first frames to determine a cardiac cycle length;
determining a second frame length, longer than the first frame length, based on the determined cardiac cycle length;
re-binning the list mode data into overlapping frames having the second frame length, based on the non-overlapping frames having the first frame length;
applying a principal component analysis (PCA) process on the re-binned list mode data having the second frame length to determine a respiratory waveform;
determining a cardiac waveform using the determined respiratory waveform; and
reconstructing an image based on the list mode data using the determined respiratory waveform and the determined cardiac waveform.

* * * * *